(12) United States Patent
Fujita et al.

(10) Patent No.: US 6,329,626 B1
(45) Date of Patent: Dec. 11, 2001

(54) WELDING APPARATUS

(75) Inventors: Shigeo Fujita; Shigeya Yamaguchi; Kazushi Otsuka; Kenichi Takahashi, all of Koga-gun (JP)

(73) Assignee: Takao Kinzoku Kogyo Co., Ltd., Koga-gun (JP)

(*) Notice: Subject to any disclaimer, the term of this patent is extended or adjusted under 35 U.S.C. 154(b) by 0 days.

(21) Appl. No.: 09/375,524

(22) Filed: Aug. 17, 1999

(30) Foreign Application Priority Data

Jun. 9, 1999 (JP) .................................................. 11-162147

(51) Int. Cl.[7] ...................................................... B23K 11/11
(52) U.S. Cl. ............................................... 219/87; 219/120
(58) Field of Search ................................... 219/86.8, 86.9, 219/87, 88, 89, 109, 110, 111, 108, 116, 120, 119; 307/147

(56) References Cited

U.S. PATENT DOCUMENTS

| | | | |
|---|---|---|---|
| 1,269,617 | * | 6/1918 | Ledwinka . |
| 3,073,947 | * | 1/1963 | Mortensen et al. . |
| 3,735,089 | * | 5/1973 | Sciaky . |
| 3,840,719 | * | 10/1974 | Cobbe . |
| 3,909,581 | * | 9/1975 | Stone et al. . |
| 4,403,132 | * | 9/1983 | Sugimoto . |
| 4,493,965 | * | 1/1985 | Houchens et al. . |
| 4,889,967 | * | 12/1989 | Iida et al. . |
| 4,924,055 | * | 5/1990 | Nakahigasi et al. . |
| 4,940,874 | * | 7/1990 | Ritter et al. . |
| 4,985,611 | * | 1/1991 | Iida et al. . |
| 5,387,774 | * | 2/1995 | Boyer et al. . |
| 5,403,988 | * | 4/1995 | Kawada et al. . |
| 5,504,299 | * | 4/1996 | Heckendorn . |
| 5,645,738 | * | 7/1997 | Cecil . |
| 5,831,234 | * | 11/1998 | Nakamura et al. . |
| 6,064,029 | * | 5/2000 | Choi et al. . |

* cited by examiner

Primary Examiner—Blaine Copenheaver
Assistant Examiner—Teresa O'Connor
(74) Attorney, Agent, or Firm—Armstrong, Westerman, Hattori, McLeland & Naughton, LLP

(57) ABSTRACT

A welding apparatus provided with a base frame having a power source portion, an electrode die portion having a lower base portion and an upper base portion at least one of which is driven to ascend and descend to close to and part from each other, plural lower electrode portions attached to the lower base portion, and plural upper electrode portions attached to the upper base portion. Further, a lower contact conductor which electrically connects the lower electrode portions to the power source portion intermittently, and an upper contact conductor which electrically connects the upper electrode portions to the power source portion intermittently, are provided to the base frame side.

6 Claims, 10 Drawing Sheets

WELDING APPARATUS

BACKGROUND OF THE INVENTION

1. Field of the Invention

This invention relates to a welding apparatus.

2. Description of the Related Art

Conventionally, as shown in FIG. 10, a welding apparatus provided with an electrode die portion c having a lower base portion a and an upper base portion b elevatable as to close to and part from the lower base portion a, plural lower electrode portions d attached to the lower base portion a, and plural upper electrode portions e attached to the upper base portion b, wherein the upper electrode portion e has a vertical welding electrode pressurizing cylinder gun g which is supplied with cooling water in unpressurized state and pressed to a welded object f placed on the lower electrode portions d to weld in pressurized state, is known. The above welding electrode pressurizing cylinder gun g has a main body portion m, a piston rod portion n inserted to the main body portion m as to freely slide, and a tip electrode portion o arranged on a lower end of the piston rod portion n protruding downward from the main body portion m.

And, in this welding apparatus provided with a power source portion i on a base frame h side, a lower contact conductor j which electrically connects the lower electrode portion d to the power source portion intermittently, and an upper contact conductor k which electrically connects the upper electrode portion e to the power source portion i, are attached to the electrode die portion c side. Further, as shown in FIG. 11, in case that vertical face of the welded object f placed on the lower electrode portions d is welded, lateral welding electrode pressurizing cylinder guns g pressed in lateral direction to the welded object f to weld are arranged on the upper base portion b.

However, this conventional welding apparatus has following problems ① through ⑤.

① Cost of the electrode die portion c is high and the electrode die portion c becomes large for contact space above the lower base portion a because the lower contact conductor and the upper contact conductor k are arranged on the electrode die portion c side.

② Current efficiency is bad and electro corrosion (roughness on contact point caused by spark generated by roughness of the surface and insufficient contact pressure) is generated on current contact face of upper die for long current passage (between the power source portion i and the electrode die portion c).

③ The vertical electrode pressurizing cylinder gun g (shown in FIG. 10) requires labor because the piston rod portion n must be removed from the main body portion m when diameter and length of the piston rod portion n, diameter of the tip electrode portion, etc. are changed, and damaged piston rod portion n is changed.

④ In case that welding spot on the vertical face of the welded object f is near an end portion of the lower base portion a, the gun attachment member p and the cylinder gun g are not arranged within the die (protrude from the die) for that the lateral electrode pressurizing cylinder gun g is attached in lateral direction to a gun attachment member p (as shown in FIG. 11). And, position of welding spot (number of welding point) is restricted thereby.

⑤ Quality of welding is greatly influenced by dispersion of electric current. For reducing the current dispersion, regulation of length and cross-section of the current passage from the power source portion i to welding position, change of welding order on simultaneous welding points, etc. are conducted based on results of measurement of the welding current and destructive examination of the welded product conventionally. This conventional method lacks stability of welding quality because influence of electrode state and deformation of the welded object f on the current of each welding point is not detected.

To solve the problems above, it is therefore an object of the present invention to provide a welding apparatus with which constructional simplification and reduction of production cost can be achieved, working efficiency is improved, and quality of welding can be stabilized.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
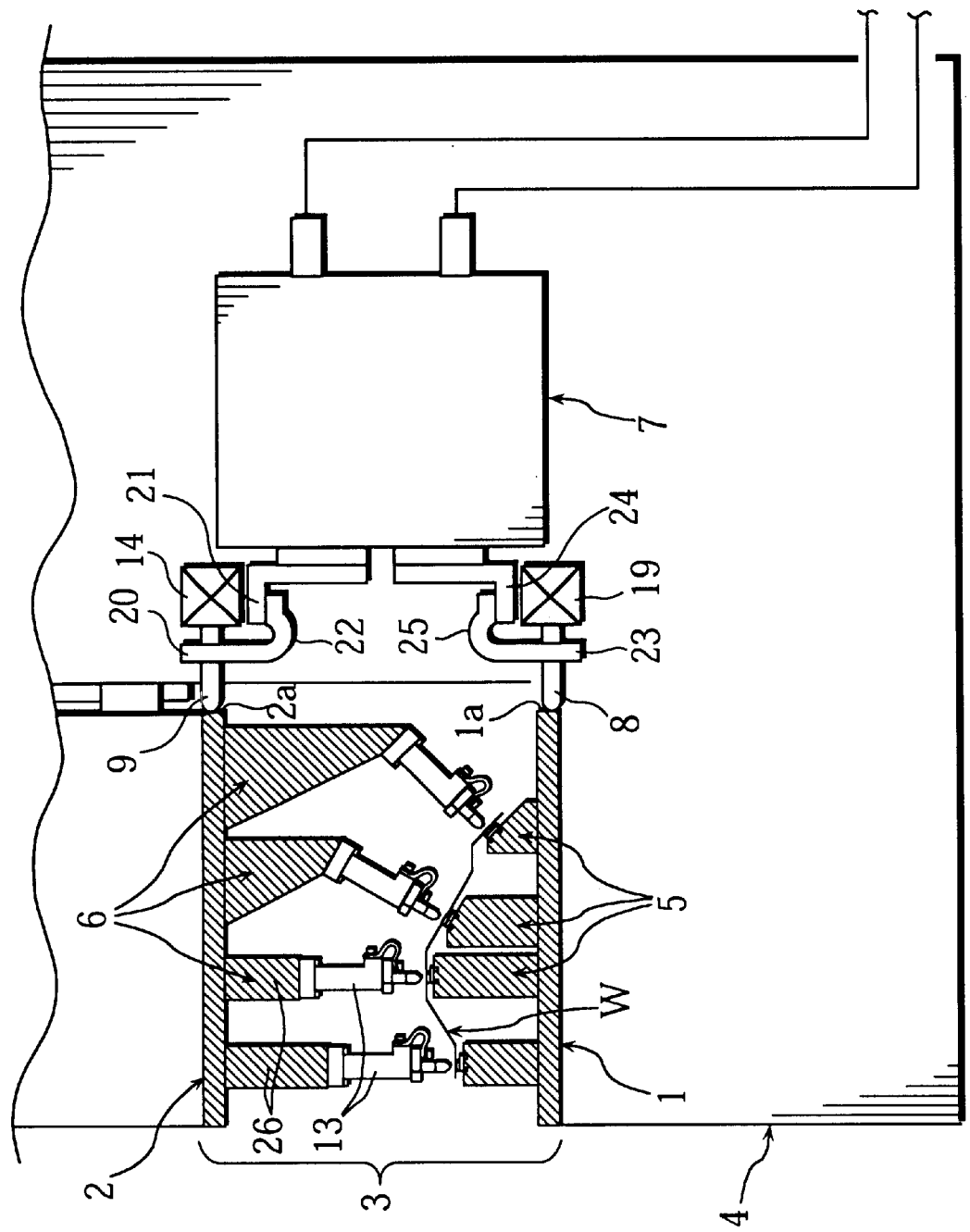
FIG. 1 is a schematic explanatory view of construction showing a preferred embodiment of a welding apparatus of the present invention.

FIG. 1 shows a preferred embodiment of a welding apparatus of the present invention. This welding apparatus is provided with an electrode die portion 3 having a lower base portion 1 and an upper base portion 2 at least one of which is driven to elevate as the upper and lower base portions freely close to and part from each other, and the electrode die portion 3 is detachably attached to a base frame 4. And, plural lower electrode portions 5 are arranged on the lower base portion 1, and plural upper electrode portions 6 are arranged on the upper base portion 2.

To describe concretely, a power source portion (transfer) 7 is arranged on the base frame 4, and the upper base portion 2 is attached to the base frame 4 as to be elevatable. And the upper electrode portion 6 is having a vertical welding electrode pressurizing cylinder gun 13 which is supplied with cooling water in unpressurized state and pressed to contact a welded object W placed on the lower electrode portion 5 in pressurized state.

And, lower contact conductors 8 which electrically connect the lower electrode portions 5 to the power source portion 7 intermittently, and upper contact conductors 9 which electrically connect the upper electrode portions 6 to the power source portion 7 intermittently, are provided to the base frame 4 side behind the electrode die portion 3 (right side of the electrode die portion 3 in FIG. 1).

In further detailed description, as shown in FIG. 1 and FIGS. 2 through 4, a horizontal stage portion 10 of the base frame 4 is arranged behind the lower base portion 1 of the electrode die portion 3 (on the right side of the lower base portion 1), and a movable frame 12 is disposed on the horizontal stage portion 10 through a pair of linear guides 11 as to slide back and forth. The above power source portion 7 is attached to the movable frame 12.

And, the movable frame 12 has a vertical fixed frame 15 on a front portion, and a pair of expansion cylinders 16 are vertically attached to an upper portion of the vertical fixed frame 15. And, a slide member 18 is arranged on a front side of the upper portion of the vertical fixed frame 15 through a pair of linear guides 17 as to slide vertically, and upper ends of the expansion cylinders 16 are connected to a backward protruding portion of the slide member 18. That is to say, the slide member 18 is vertically moved by expansion and contraction of the expansion cylinders 16.

And, four upper cylinders 14 which expand and contract are fixed to a front face of the slide member 18 with predetermined intervals in a horizontal row, and four contact conductors 20 are arranged in front of the upper cylinders 14. Then, lower ends of four upper flexible conductors (shunt plates) 22 are electrically connected to a connection terminal 21 of the power source portion 7 respectively, and upper ends of the upper flexible conductors are electrically connected to the contact conductors 20 respectively. Further, upper contact conductors 9 are attached to rod ends of the upper cylinders 14 respectively, and each of the upper contact conductors 9 is inserted to a hole formed on each of the contact conductors 20. In this case, the upper contact conductor 9 is inserted to the hole as to slide back and forth to the contact conductor 20, moved back and forth by the upper cylinder 14, and electric current can run between the power source portion T and the upper electrode portion 6 thereby.

And, four lower cylinders 19 are fixed to positions corresponding to the four upper cylinders 14 on a lower portion of the front face of the vertical fixed frame 15 of the base frame 4, and four contact conductors 23 are arranged in front of the lower cylinders 19. And, upper ends of four lower flexible conductors (shunt plates) 25 are electrically connected to another connection terminal 24 of the power source portion 7 respectively, and lower ends of the lower flexible conductors 25 are electrically connected to the contact conductors 23 respectively. Further, lower contact conductors 8 are attached to rod ends of the lower cylinders 19 respectively, and each of the lower contact conductors 8 is inserted to a hole formed on each of the contact conductors 23. In this case, the lower contact conductor 8 is inserted to the hole as to slide back and forth to the contact conductor 23, moved back and forth by the lower cylinder 19, and electric current can run between the power source portion 7 and the lower electrode portion 5 thereby. The lower contact conductor 8 is arranged to be in a height position approximately same as that of the lower base portion 1.

Figure 2:
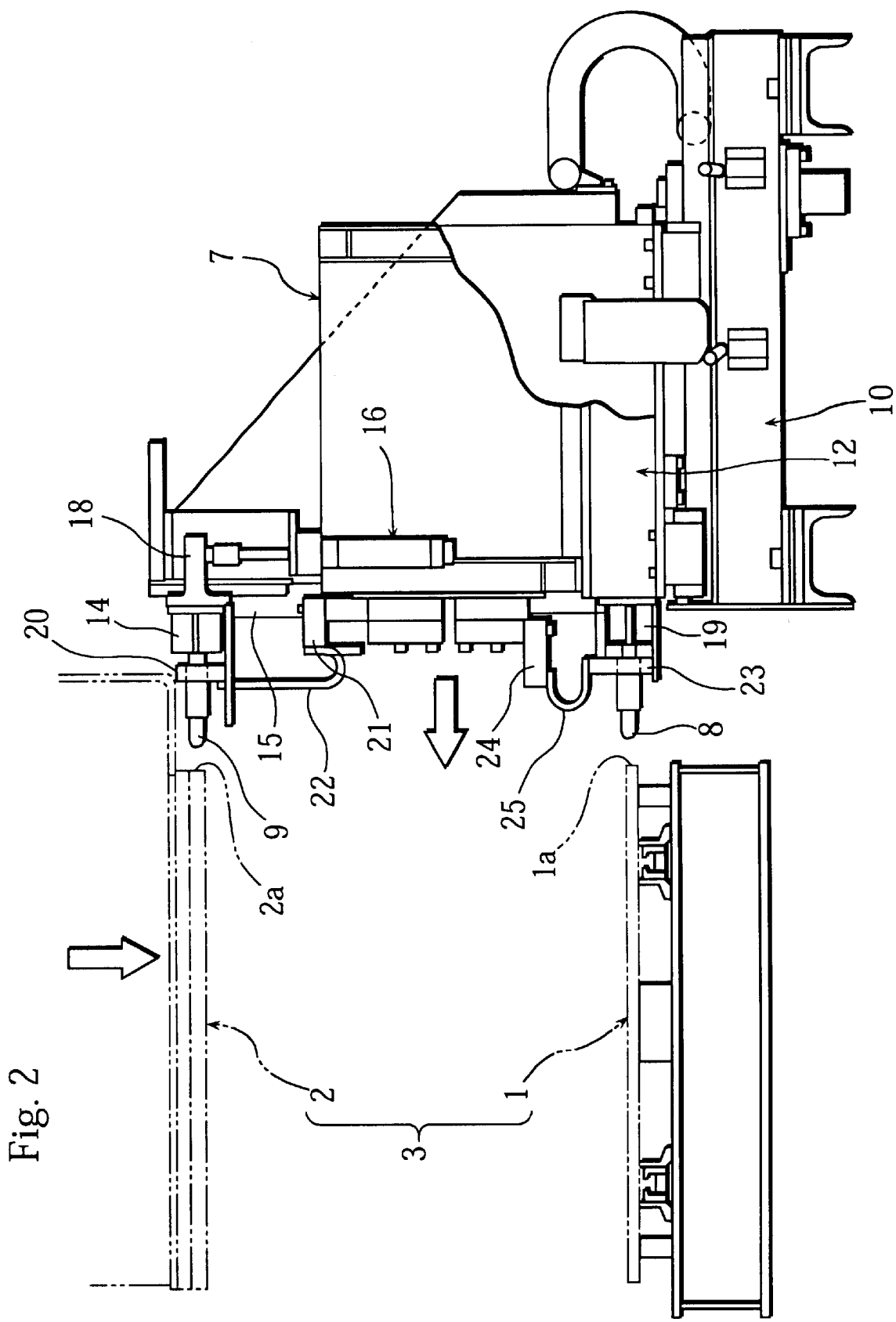
FIG. 2 is an explanatory side view showing upper and lower contact conductors and their surrounding construction
Figure 3:
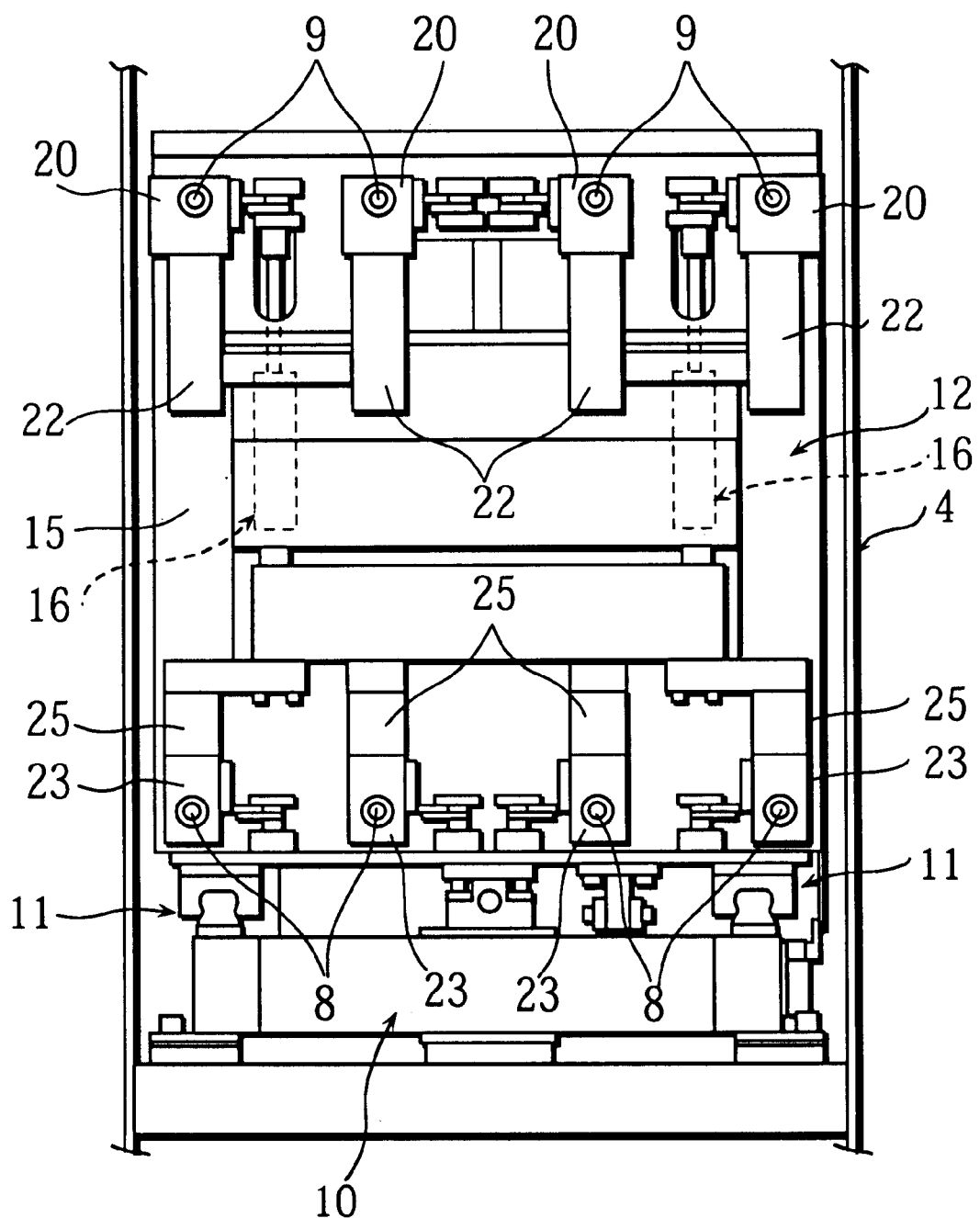
FIG. 3 is an explanatory front view showing the upper and lower contact conductors and their surrounding construction

In welding, as shown in FIG. 2, the upper base portion 2 descends to a predetermined height position, the movable frame 12 is moved forward to a predetermined position on the electrode die portion 3 side by a reciprocating mechanism (not shown in Figures), the upper contact conductors 9 close to an end face 2a of the upper base portion 2 in lateral direction thereby, and the lower contact conductors 8 close to an end face 1a of the lower base portion 1 in lateral direction. Height position of the upper contact conductors 9 is adjusted to a height position of the descended upper base portion 2 by moving the slide member 18 vertically with the expansion cylinders 16 beforehand.

Figure 4:
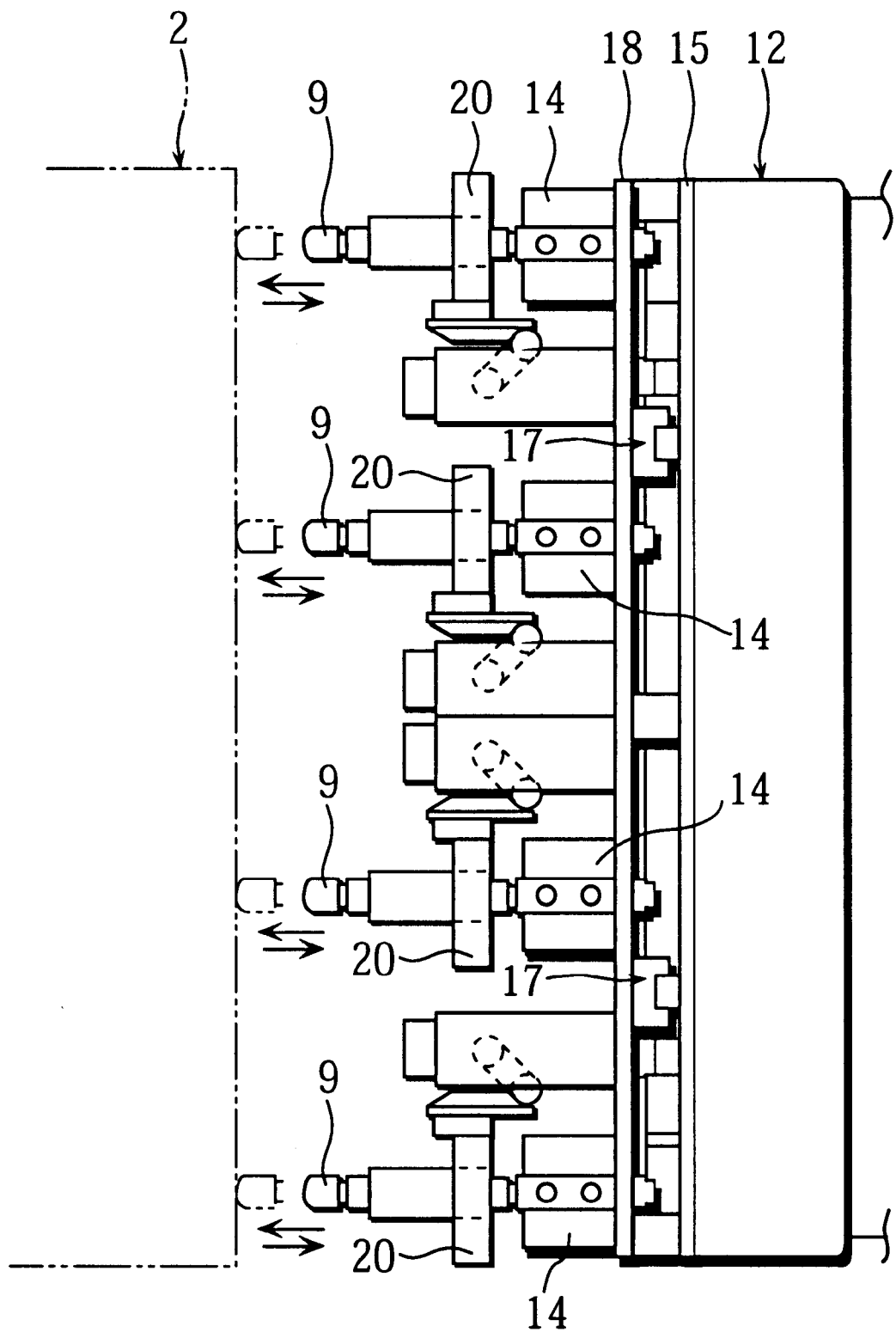
FIG. 4 is a top view of a principal portion showing the upper contact conductor.

Then, as shown in FIG. 1 and FIG. 4, a predetermined pair of the upper contact conductor 9 and the lower contact conductor 8 is moved forward by the upper cylinder 14 and the lower cylinder 19, the upper contact conductor 9 contacts the end face 2a of the upper base portion 2, and the lower contact conductor 8 contacts the end face 1a of the lower base portion 1. The upper base portion 2 and the lower base portion 1 are composed of conductive material. And, the welding electrode pressurizing cylinder gun 13 of a predetermined upper electrode portion 6 is pressurized by cooling water, the cylinder gun 13 is extended and pressed to the welded object W placed on the lower electrode portion 5, welding current runs between the upper electrode portion 6 and a lower electrode portion 5 corresponding to the upper electrode portion 6 thereby, and the welded object W is welded.

In case, for example, that four pairs of the upper electrode portions 6 and the lower electrode portions 5 are provided and each pair conducts welding as shown in FIG. 1, each pair of the upper contact conductor 9 and the lower contact conductor 8 corresponding to each pair of the upper electrode portion 6 and the lower electrode portion 5 contacts the upper base portion 2 and the lower base portion 1 serially to weld. Further, each of the lower electrode portions 5 is insulated with insulating material. The welding current is prevented by the insulation from branching into other lower electrode portion 5 side through the welded object W in welding (reactive current is not generated) thereby, and the welding current can be concentrated to the welding point. And, when plural pairs of the upper electrode portions 6 and the lower electrode portions 5 compose a group and the lower electrode portions 5 of each group are insulated, welding is conducted without generating reactive current in each group.

Figure 5:
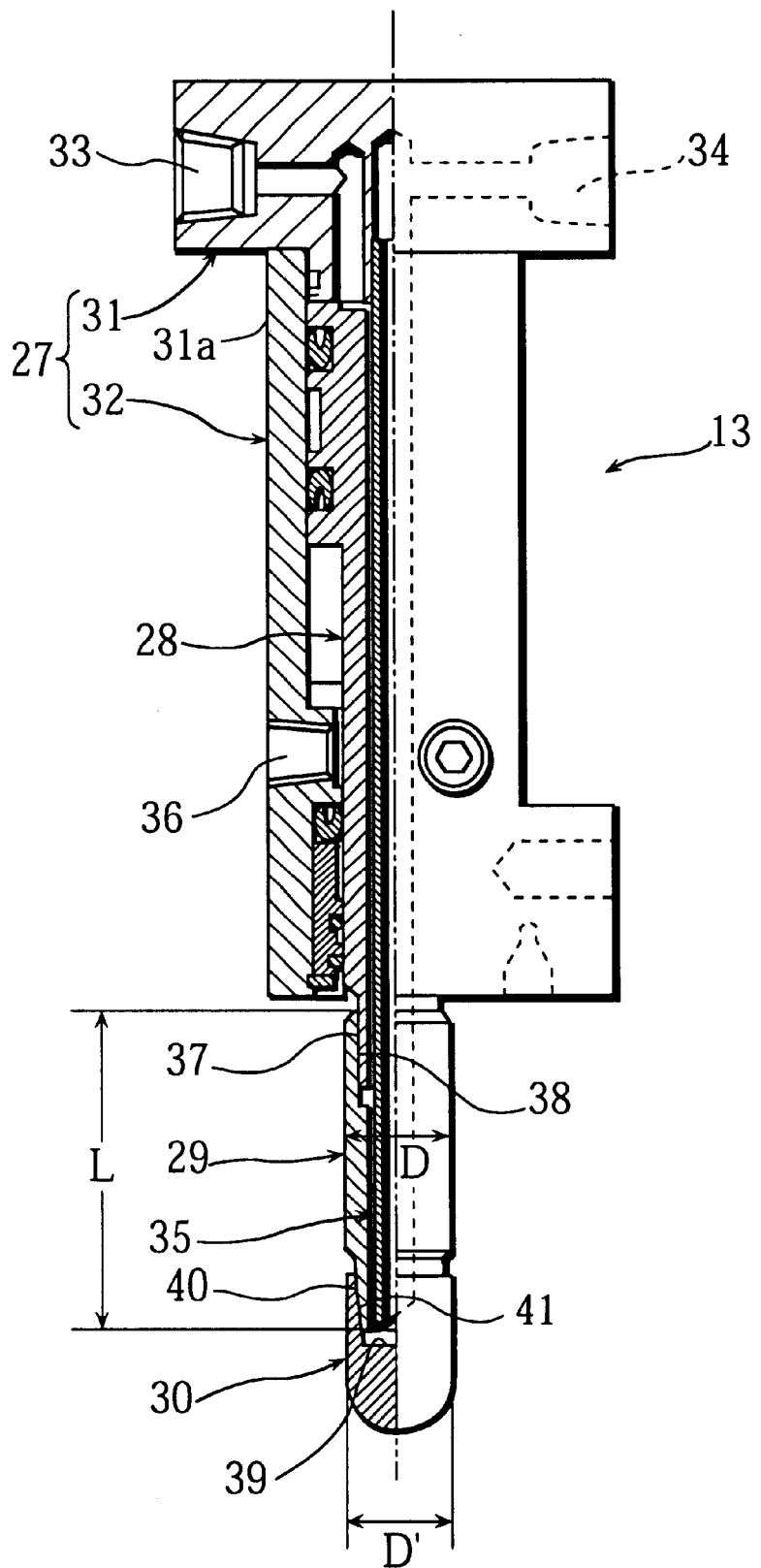
FIG. 5 is a half cross-sectional view showing a vertical welding electrode pressurizing cylinder gun.

And, as shown in FIG. 1 and FIG. 5, this vertical welding electrode pressurizing cylinder gun 13 is provided with a main body portion 27 attached to a gun attachment member 26 (attached to the upper base portion 2) of the upper electrode portion 6, a cylindrical piston rod portion 28 inserted to the main body portion 27 as to freely slide, a cylindrical extension rod portion 29 detachably attached to an end of the piston rod portion 28 protruding from the main body portion 27, and a tip electrode portion 30 attached to an end of the extension rod portion 29.

The main body portion 27 is composed of a flange portion 31 and an outer cylinder portion 32 of which base end is outsertedly attached to a protruding portion 31a of the flange portion 31, the flange portion 31 is provided with an inlet hole 33 for cooling water intake and an outlet hole 34 for cooling water outflow, and the outer cylinder portion 32 is provided with an air supplying hole 36 for supplying compressed air. And, a base end of a cooling tube 35 is communicatively connected to the outlet hole 34 going through the center of the protruding portion 31a. The cooling tube 35 is inserted to holes of the piston rod portion 28 and the extension rod portion 29, and between the piston rod portion 28 and the cooling tube 35, between the extension rod portion 29 and the cooling tube 35, a concave portion 39 of the tip electrode portion 30 attached to the extension rod portion 29, and inside of the cooling tube 35, compose a passage for the cooling water.

And, a tapered peripheral face 37 is formed on the end of the piston rod portion 28 and a tapered inner peripheral face 38 is formed on a hole portion on the base end of the extension rod portion 29, and the tapered inner peripheral face 38 of the extension rod portion 29 is press-fitted to the tapered peripheral face 37 of the piston rod portion 28. And, a tapered peripheral face 40 is formed on an end of the extension rod portion 29 and a tapered inner peripheral face 41 is formed on the concave portion 39 of the tip electrode portion 30, and the tapered inner peripheral face 41 of the tip electrode portion 30 is press-fitted to the tapered peripheral face 40 of the extension rod portion 29.

That is to say, the extension rod portion 29 detachably attached to the piston rod portion 28 is easily changed to another extension rod portion 29 suitable for a specific welding operation (welded object W) by preparing plural kinds of the extension rod portions 29 having different length L, outer diameter D, and diameter of the tip electrode portion D, and able to be swiftly changed in breakdown. Therefore, it is not necessary to detach the piston rod portion 28 from the main body portion 27, and operationality is improved thereby. And, it is preferable to prepare tip electrode portions 30 corresponding to various kinds of extension rod portions 29.

Therefore, in electrode pressurized state that the cooling water is pressurized, the piston rod portion 28 pressed by water pressure protrudes downward (becomes extended state), the tip electrode portion 30 is pressed to the welded object W to weld. And, after the welding, the piston rod portion 28 is pressed upward by air pressure to return (become contracted state) with compressed air send from the air supplying hole 36 of the outer cylinder portion 32.

Figure 6:
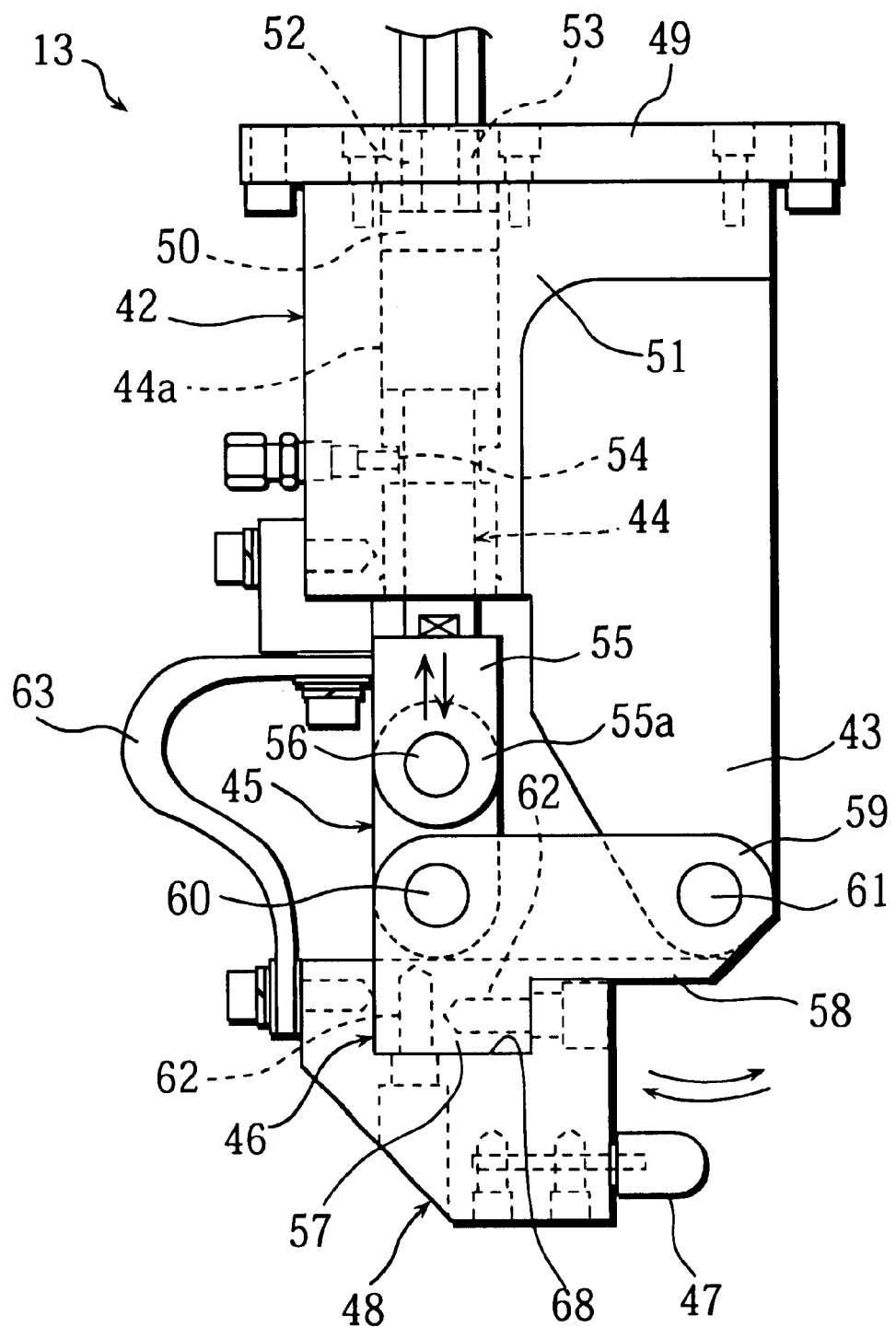
FIG. 6 is a side view showing a lateral welding electrode pressurizing cylinder gun.
Figure 7:
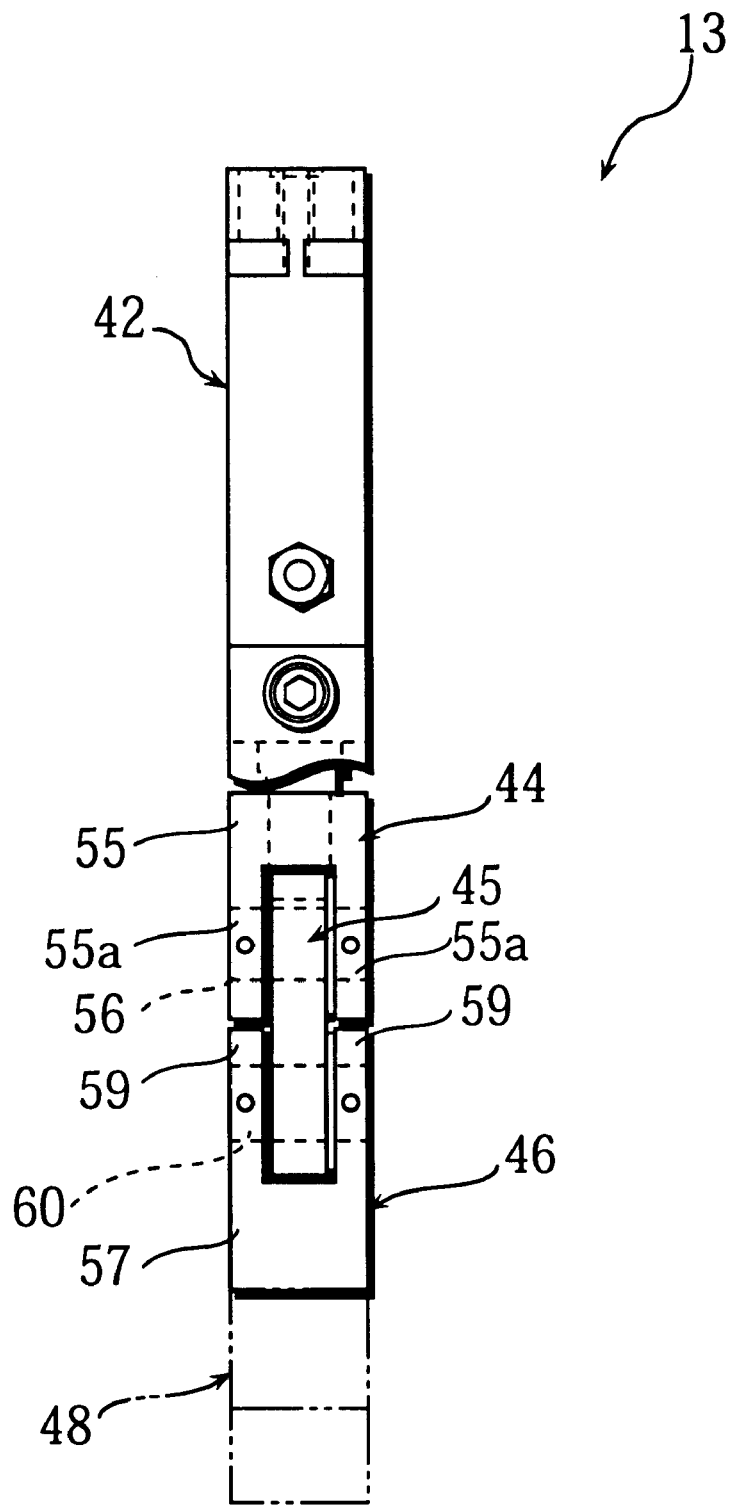
FIG. 7 is an explanatory front view showing the lateral welding electrode pressurizing cylinder gun.
Figure 8:
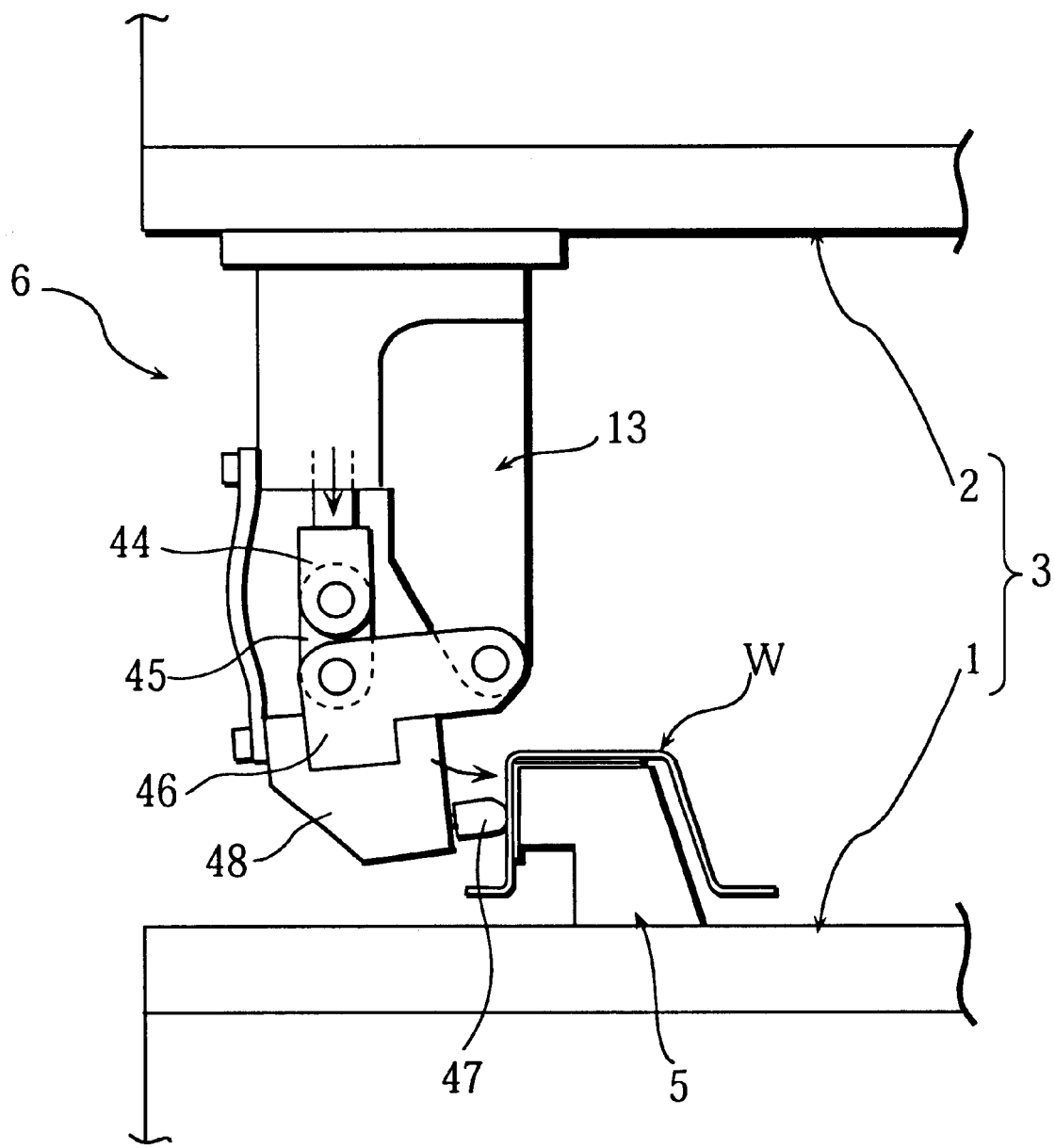
FIG. 8 is a working explanatory view showing welding state.

Next, FIG. 6 through FIG. 8 show a lateral welding electrode pressurizing cylinder gun 13 of the upper electrode portion 6. This cylinder gun 13 is used in case that position of welding point of the welded object W is on a vertical face. The lateral cylinder gun 13 is provided with a main body portion 42, of which upper end is attached to the upper base portion 2, having an attachment protruding piece 43 on a lower end, a piston rod portion 44 inserted to the main body portion 42 as to freely slide vertically, a link portion 45 connected to a lower end of the piston rod portion 44 of which upper end protrudes from the main body portion 42, an oscillating attachment portion 46 of which one end is connected to the attachment protruding piece 43 of the main body portion 42 and another end is connected to a lower end of the link portion 45, and an electrode block portion 48 having a tip electrode portion 47 and detachably attached to the oscillating attachment portion 46.

The main body portion 42 has a flange portion 49 attached to the upper base portion 2, a cylinder portion 51 having a vacant chamber 50 to which a head portion 44a of the piston rod portion 44 is inserted as to freely slide, and the above attachment protruding piece 43 having an attachment hole and suspended downward from the cylinder portion 51. And, the flange portion 49 is provided with an inlet hole 52 for cooling water intake of the vacant chamber 50 and an outlet hole 53 for cooling water outflow from the vacant chamber 50, and the cylinder portion 51 is provided with an air supplying hole 54 for supplying compressed air to the vacant chamber 50.

And, the piston rod portion 44 has a bifurcate attachment member 55 having attachment holes on the lower end, the link portion 45 having an attachment holes is placed between a pair of attachment pieces 55a, and an upper end of the link portion 45 is attached to the attachment member 55 with a connecting shaft 56 as to freely oscillate.

And, the oscillating attachment portion 46 is composed of a rectangle block portion 57, a thin-wall portion 58 arranged to form the same plane as an upper face of the block portion 57, and a pair of attachment pieces 59 having attachment holes and protruding from the upper face of the block portion 57 and the thin-wall portion 58. The lower end of the link portion 45 is placed between the pair of attachment pieces 59 on the block portion 57 side, the oscillating attachment portion 46 is attached to the link portion 45 with a connecting shaft 60 as to freely oscillate, and a lower end of the attachment protruding piece 43 is placed between the pair of attachment pieces 59 and connected with a connecting shaft 61.

And, the electrode block portion 48 has a concave groove 68 opening upward, the block portion 57 of the oscillating attachment portion 46 is fitted to the concave groove 68, and the electrode block portion 48 is connected to the block portion 57 with two bolts 62. 63 represents a flexible conductor. One end of the flexible conductor 63 is attached to the main body portion 42 with a bolt, and another end is attached to the electrode block portion 48 with a bolt.

Then, in welding, the upper base portion 2 is descended and the tip electrode portion 47 of the cylinder gun 13 is closed to the vertical face of the welded object W, the piston rod portion 48 is worked to descend by water pressure of the cooling water in the vacant chamber 50 in electrode pressurizing state shown in FIG. 8, and the tip electrode portion 47 of the electrode block portion 48 is oscillated through the oscillating attachment portion 46 thereby and pressed to the welded object W in lateral direction to weld.

According to this lateral cylinder gun 13, gun attachment member can be omitted or simplified, the cylinder gun 13 can be arranged within the electrode die portion 3. And, welding on conventionally impossible positions becomes possible, and welding range can be enlarged (number of welding points is increased). Further, welding suitable for the welded object W can be conducted by preparing various kinds of electrode block portions 48 having different configurations and sizes because the electrode block portion 48 is detachable.

Figure 9A:
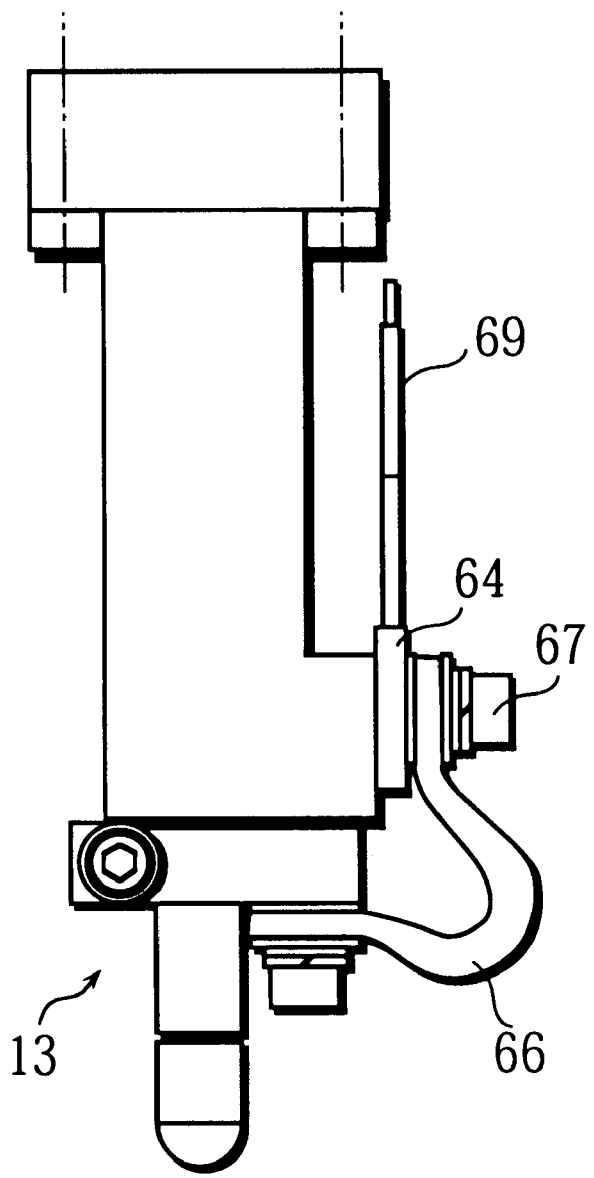
FIG. 9A is an explanatory view showing attached state of a gun current detecting sensor.
Figure 9B:
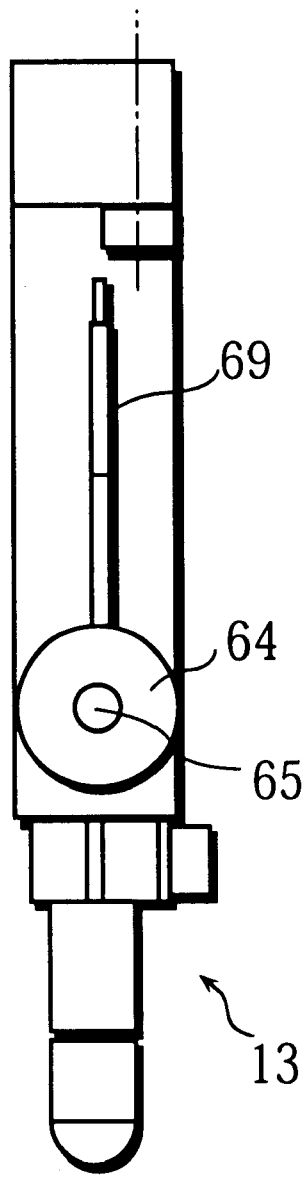
FIG. 9B is an explanatory view showing attached state of the gun current detecting sensor.
Figure 10:
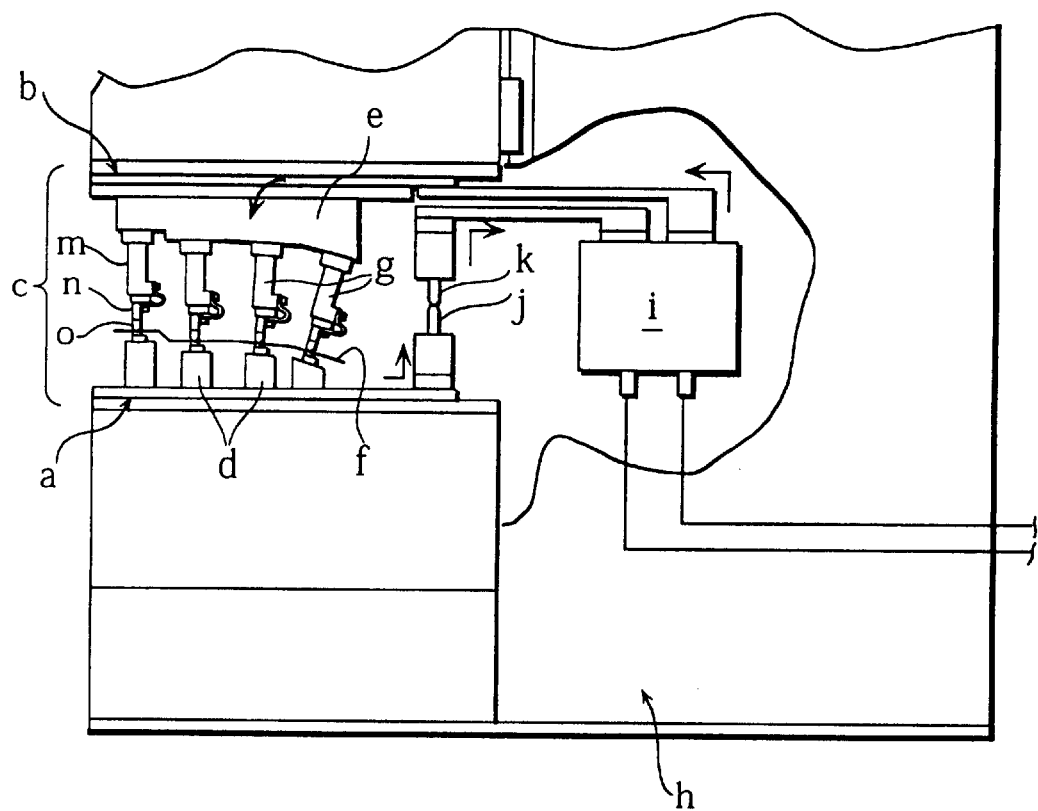
FIG. 10 is a schematic explanatory view of construction showing a conventional example.
Figure 11:
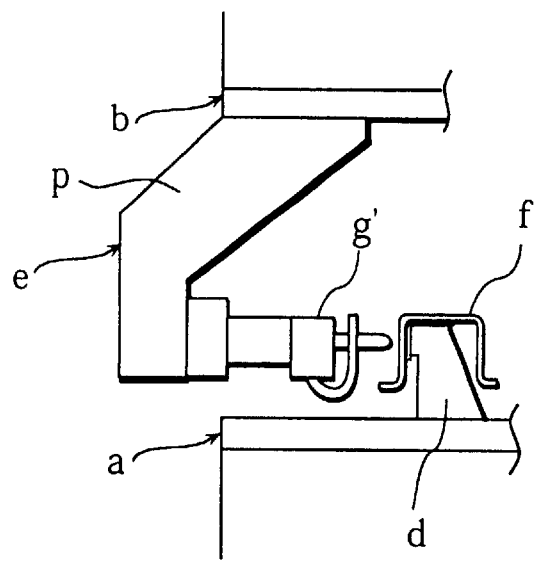
FIG. 11 is an explanatory view showing a conventional horizontal welding electrode pressurizing cylinder gun.

And, as shown in FIG. 9, in the welding apparatus of the present invention, the welding electrode pressurizing cylinder gun 13 may be provided with a gun current detecting sensor 64 for detection of welding current of the electrode and non-destructive examination of welding quality level. This discoid gun current detecting sensor 64 is formed as that the same material as the material for the cylinder gun 13 (brass, for example) is used as a conductor base, and a coil is insulated with molded epoxy resin. 69 represents an electric wire which sends detected signal from the sensor 64 to an input amplifier side. Number of coil winding is determined on detected voltage on the input amplifier side with measuring actual current magnetic field. And, this sensor 64 is provided with an attachment hole 65 on the center, the sensor 64 is placed between the cylinder gun 13 and a flexible conductor 66 and fixed with a bolt 67 as to be an electrode conductor passage of the cylinder gun itself.

Then, the gun current detecting sensor 64 is attached to each of the plural cylinder guns 13 in the welding apparatus, welding current detection (current magnetic field detection) is measured and judged by each of the cylinder guns 13, for example, checking whether electric current of set ampere runs or not, and, resistant condition of each current passage, actual welding state, time for electrode change, etc. are detected thereby. Although a vertical cylinder gun 13 provided with the sensor 64 is shown in FIG. 9, the lateral cylinder gun 13 described with reference to FIG. 6 through FIG. 8 is also provided with the sensor 64.

According to the welding apparatus of the present invention, construction of the electrode die portion 3 can be simplified, production cost can be reduced, and the electrode die portion 3 can be compactified for that large electric contacts in the electrode die portion 3 can be omitted. And, the current passage (between the power source portion T and the electrode die portion 3) becomes short, current efficiency is improved, and electro corrosion (roughness on contact point caused by spark generated by roughness of the surface and insufficient contact pressure), conventionally generated on current contact face of upper die, is eliminated.

And, the extension rod portion 29 detachably attached to the piston rod portion 28 is easily changed to another extension rod portion 29 suitable for a specific welding operation (welded object W) by preparing plural kinds of the extension rod portions 29 having different length L, outer diameter D, and diameter of the tip electrode portion D, and able to be swiftly changed in breakdown. That is to say, it is not necessary to detach the piston rod portion 28 from the main body portion 27, and operationality is improved thereby. And, general-purpose element of the main body portion 27 is enlarged, and cost of the apparatus is reduced thereby.

And, according to the welding apparatus of the present invention, gun attachment member can be omitted or simplified, the cylinder gun 13 can be arranged within the electrode die portion 3. Accompanying this, welding on a conventionally impossible position to weld becomes possible, and it is possible to enlarge welding range (increase the number of the welding points). Further, suitable welding for the welded object W can be easily conducted with preparing various kinds of the electrode block portions 48 having different configurations and sizes, since the electrode block portion 48 is detachable.

Further, according to the welding apparatus of the present invention, it is possible to know resistant condition of each current passage, actual welding state, time for electrode change, etc. by detecting current magnetic field with the gun current detecting sensor 64 attached to each welding electrode pressurizing cylinder gun 13. That is to say, defection of the welded product can be reduced.

While preferred embodiments of the present invention have been described in this specification, it is to be understood that the invention is illustrative and not restrictive, because various changes are possible within the spirit and indispensable features.

What is claimed is:

1. A welding apparatus comprising:
   a base frame having a power source portion,
   an electrode die portion having a lower base portion and an upper base portion at least one of which is driven to ascend and descend to freely close to and part from each other,
   plural lower electrode portions attached to the lower base portion,
   plural upper electrode portions attached to the upper base portion,
   lower contact conductors to intermittently connect the lower electrode portions to the power source portion, said lower contact conductors being laterally movable to and from the lower electrode portion, and
   upper contact conductors to intermittently connect the upper electrode portions to the power source portion, said upper contact conductors being laterally movable to and from the upper electrode portion.

2. A welding apparatus according to claim 1, wherein the upper electrode portions have vertical welding electrode pressurizing cylinder guns which arc supplied with cooling water in unpressurized state and pressed to a welded object placed on the lower electrode portions to weld in pressurized state, wherein the welding electrode pressurizing cylinder gun comprises: a main body portion, a piston rod portion inserted to the main body portion as to freely slide, an extension rod portion detachably attached to an end of the piston rod portion protruding from the main body portion, and a tip electrode portion attached to an end of the extension rod portion.

3. A welding apparatus according to claim 1, wherein the upper electrode portions comprise welding electrode pressurizing cylinder guns which are pressed to a welded object placed on the lower electrode portions to weld, each of the cylinder guns having a gun current detecting sensor.

4. A welding apparatus provided with an electrode die portion having a lower base portion and an upper base portion at least one of which is driven to ascend and descend to freely close to and part from each other, plural lower electrode portions attached to the lower base portion, and plural upper electrode portions attached to the upper base portion having lateral welding electrode pressurizing cylinder guns which are supplied with cooling water in unpressurized state and pressed to a welded object placed on the lower electrode portions to weld in pressurized state, comprising a construction in which;
   the welding electrode pressurizing cylinder gun is provided with a main body portion having an attachment protruding piece, a piston rod portion inserted to the main body portion as to freely slide vertically, a link portion of which upper end is connected to a lower end of the piston rod portion protruding from the main body portion, an oscillating attachment portion of which one end is connected to the attachment protruding piece of the main body portion and another end is connected to a lower end of the link portion, and an electrode block portion, having a tip electrode portion, detachably attached to the oscillating attachment portion; and
   the tip electrode portion of the electrode block portion is oscillated by descending movement of the piston rod portion through the oscillating attachment portion, and pressed to the welded object in lateral direction to weld.

5. A welding apparatus according to claim 4, wherein the upper electrode portions have vertical welding electrode pressurizing, cylinder guns which arc supplied with cooling water in unpressurized state and pressed to a welded object placed on the lower electrode portions to weld in pressurized state, wherein the welding electrode pressurizing cylinder gun comprises: a main body portion, a piston rod portion inserted to the main body portion as to freely slide, an extension rod portion detachably attached to an end of the piston rod portion protruding from the main body portion, and a tip electrode portion attached to an end of the extension rod portion.

6. A welding apparatus according to claim 4, wherein the upper electrode portions comprise welding electrode pressurizing cylinder guns which are pressed to a welded object placed on the lower electrode portions to weld, each of the cylinder guns having a gun current detecting sensor.

* * * * *